United States Patent
Saporetti (10) Patent No.: US 9,298,959 B2
(45) Date of Patent: Mar. 29, 2016

(54) METHOD AND SYSTEM FOR RECORDING IMAGES OF SURFACES OF MOVING OBJECTS WITH REDUCED DISTORTION

(75) Inventor: Claudio Saporetti, Bologna (IT)

(73) Assignee: DATALOGIC IP TECH S.R.L., Calderara di Reno (Bologna) (IT)

( * ) Notice: Subject to any disclaimer, the term of this patent is extended or adjusted under 35 U.S.C. 154(b) by 0 days.

(21) Appl. No.: 14/368,413

(22) PCT Filed: Dec. 29, 2011

(86) PCT No.: PCT/IT2011/000420
§ 371 (c)(1),
(2), (4) Date: Jun. 24, 2014

(87) PCT Pub. No.: WO2013/098860
PCT Pub. Date: Jul. 4, 2013

(65) Prior Publication Data
US 2014/0367468 A1    Dec. 18, 2014

(51) Int. Cl.
*G06K 7/10* (2006.01)
*G06K 9/20* (2006.01)
*H04N 1/387* (2006.01)
*G06K 7/14* (2006.01)

(52) U.S. Cl.
CPC ........ *G06K 7/10722* (2013.01); *G06K 7/10792* (2013.01); *G06K 7/1465* (2013.01); *G06K 9/209* (2013.01); *H04N 1/387* (2013.01)

(58) Field of Classification Search
USPC ........................................ 235/454
See application file for complete search history.

(56) References Cited

U.S. PATENT DOCUMENTS

| | | | |
|---|---|---|---|
| 5,521,368 | A | 5/1996 | Adachi |
| 8,360,316 | B2 | 1/2013 | Reichenbach et al. |
| 2006/0192010 | A1* | 8/2006 | Massieu et al. ............... 235/454 |

FOREIGN PATENT DOCUMENTS

| | | |
|---|---|---|
| EP | 2026249 B1 | 2/2010 |
| WO | WO03044586 A1 | 5/2003 |
| WO | WO2008078129 | 12/2006 |

OTHER PUBLICATIONS

International Search Report and Written Opinion dated Jul. 25, 2012 from International Application No. PCT/IT2011/000420.

* cited by examiner

*Primary Examiner* — Jamara Franklin
(74) *Attorney, Agent, or Firm* — Duane Morris LLP (57) ABSTRACT

A method of capturing an image on a surface of an object by line sensor(s), wherein consecutive line images are taken from a plurality of surfaces or surface portions having a different inclination to a given reference plane with a predetermined frequency during a relative movement of the object with regard to the line sensors(s) and a two-dimensional first image of the surfaces or surface portions is formed from these line images, includes resampling the two-dimensional first image so as to reduce the surface resolution of an image or of images of one or more surfaces or surface portions with regard to a direction oblique to the direction of the lines corresponding to consecutive line images taken by a line sensor in such a way that differences in the surface resolution of images of surfaces or surface portions with different inclination to the reference plane are reduced or eliminated.

14 Claims, 6 Drawing Sheets

Original surface          Image of the inclined surface captured by the sensor

METHOD AND SYSTEM FOR RECORDING IMAGES OF SURFACES OF MOVING OBJECTS WITH REDUCED DISTORTION

BACKGROUND AND SUMMARY OF THE INVENTION

The invention relates to a system and a method of capturing an image on the surface of an object by means of one or more line sensors, especially a system and method for capturing an image of a code, such as a barcode, a human readable code, especially a code used for OCR, a two-dimensional code or the like, for later recognition and decoding. The invention especially relates to such applications, wherein an object is moved past one or more line sensors of a conveying device, e.g. a belt conveyor, a tray conveyor or the like.

When two-dimensional images, especially bar codes or other optical codes, are recorded by line sensors, such as line cameras or sensors with a linear arrangement of CCD elements, a two-dimensional image is generated by combining consecutive line images to form a two-dimensional image. A problem that arises in this regard is that depending on the distance of an object from the line sensor, more precisely of the surface of an object that is being imaged, the surface resolution, i.e. the number of pixels per unit length of a surface that is being imaged, may vary, depending on the distance of the object from the line sensor (cf. FIG. 1). The image of a surface that is more distant from a line sensor will have a lower surface resolution, as it will take a smaller portion of the overall line image (which consists of a given number of pixels) than the line image of a surface that is closer to the line sensor. Furthermore, surfaces that are inclined to a plane perpendicular to the optical axis of the line sensor will have a lower surface resolution in the direction of movement, because according to standard trigonometric relations, the distance between two line images on an inclined surface is larger than on a surface that is not or less inclined (cf. FIG. 2). Both effects result in distortion of the image of the surfaces (as illustrated in FIG. 3), which makes code recognition, but especially text recognition more difficult. Many text recognition programs have difficulties processing images which have a different resolution in different regions of an image.

In order to address the different resolution of line images of surfaces having a different distance from a line camera, WO 03/044586 A1 proposes to rescale the surface resolution of the individual line images to a homogeneous surface resolution that corresponds to the lowest resolution of a line image.

EP 2 026 249 B1 proposes to address the varying resolution by adjusting the zoom for each line image to be taken in such a way that a homogeneous surface resolution of the line images results and to adjust the imaging frequency of a line sensor depending on a distance profile of a surface individually for each line to be imaged such that the surface resolution in the direction of movement will be homogeneous for surfaces with different inclination.

It is the object of the present invention to provide a method and system that allow for more homogeneous resolution in a direction oblique to the line images of the sensor and especially in the direction perpendicular to the lines.

According to the invention, this object is accomplished by a method of capturing an image on a surface of an object by means of one or more line sensors, wherein consecutive line images are taken from a plurality of surfaces or surface portions having a different inclination to a given reference plane with a predetermined frequency during a relative movement of said object with regard to one or more of said line sensors and wherein a two-dimensional first image of the surfaces or surface portions is formed from these line images, wherein said two-dimensional first image may comprise a plurality of line images, the method comprising resampling said two-dimensional first image, so as to reduce the surface resolution of an image or of images of one or more surfaces or surface portions with regard to a direction oblique to the direction of lines corresponding to consecutive line images taken by a line sensor, especially to a direction perpendicular to these lines, in such a way that differences in the surface resolution of images of surfaces or surface portions with different inclination to said reference plane are reduced and preferably eliminated.

The method according to the invention can especially be applied to capturing images on a three-dimensional object, e.g. an object that is moved past one or more line sensors on a conveying device, such as a belt conveyor, a tray conveyor or the like. In certain embodiments of the invention, the one or more sensors may be moved relative to the object, e.g. by means of a carriage supporting one or more line sensors to scan a stationary object, but in some embodiments both the object and the sensors may also be moving with regard to a stationary reference system.

The image on the surface can especially be an optical code, such as a one- or two-dimensional barcode or human readable characters (OCR codes) and the method may especially comprise evaluating these codes as to their contents.

The method of the invention may comprise resampling said two-dimensional first image at least in a direction oblique to the direction of lines corresponding to consecutive line images taken by a line sensor, especially at least in the direction perpendicular to these lines. The invention may also provide that said direction oblique to the direction of the lines is the direction of said relative movement.

The invention may provide for resampling said two-dimensional first image such that the difference in the surface resolution with regard to said direction between images of surfaces or surface portions with different inclination to said reference plane has an amount below a predetermined threshold.

In one embodiment the invention may provide that said resampling is carried out such that the surface resolution with regard to said direction of the images of all surfaces or surface portions with different inclination to said reference plane will be reduced and preferably eliminated.

Whereas in a preferred embodiment an image of the surfaces or surface portions is produced by taking consecutive line images by a single line sensor, the invention may also provide that two or more lines sensors cooperate in establishing an image of the surfaces or surface portions, e.g. by providing two parallel line sensors such that two line images are taken at the same time or the line sensors alternate in taking a line image.

One, more or all of the line sensors can especially be a line camera. Likewise, a line camera having two or more line sensors incorporated therein may be provided within the concept of the invention. The above-mentioned predetermined frequency does not depend on the geometry of the object to be imaged or on its geometrical relation to the line sensor or sensors.

Generally, said predetermined frequency will be determined such that even under the worst geometrical relation between the sensors and the object a sufficient resolution will be achieved. Especially, if the image is a code or symbol, the frequency will be chosen such that the resolution of the image will be sufficient for image recognition, especially code recognition or decoding, on the basis of the captured image.

The invention may provide that the inclination of the surfaces or the surface portions with regard to the reference plane is determined and the thus determined inclination is used to calculate a correction, especially a local or surface-specific correction, to the resolution of the resampled image in said direction. This correction may especially be a correction to the local or surface-specific distance between lines on the surface or surface portion corresponding to line images of a line sensor.

A possible way of determining the inclination is to measure the inclination during the imaging or reading process, i.e. the inclination is measured by a suitable device, while the object is moving past the line sensor or line sensors (or vice versa). The invention may especially provide to make consecutive measurements of the distance of the surface or surface portion from a line sensor and to calculate an inclination from the distance values, especially consecutive distance values. This results in a local inclination values or an inclination value associated with a group of lines, which can be used to correct the resolution of a line or a plurality of lines of the first image, which lines have a direction oblique to the direction of said relative movement.

Alternatively, especially if the object is moved on a conveyor, the orientation of the object on the conveyor and thus also its orientation with regard to line sensors may be determined by a suitable device, e.g. by a 2-D camera taking a picture of the object on the conveyor before it passes the line sensor or sensors, from which the geometry and the orientation of the object is determined. Subsequently, the position of the object on the conveyor is tracked, e.g. by means of an encoder at the conveying device that provides signals corresponding to an incremental advance of the conveyor, and when it is determined that the object passes the line sensor or line sensors, the inclination at the point or in the region is determined where a line image is taken.

In case of objects with plane surfaces a method according to the invention may also comprise determining the position of the edges between the surfaces of the object and determining, based on the position of the object as a whole with regard to the line sensors and based on the information about the position of the edges, on which surface a line image is taken. For each of these surfaces the inclination to the given reference plane is determined in advance and the respective inclination value is associated with the line image, the resolution of which will then be corrected in dependence of the associated inclination.

In a preferred embodiment, said first two-dimensional image consists of parallel lines, wherein each of said lines corresponds to the image of an imaginary line on a surface or surface portion that is being imaged. They may especially correspond to line images taken by a line sensor or sensors. Said first two-dimensional image is, however, not necessarily the raw image that results from the consecutive (raw) line images taken by a line sensor, while it moves relative to the object. These raw images may also be processed prior to the above-mentioned resampling step. For example and as will be explained in more detail below, the resolution of the (raw) line images may be adjusted so as to produce a homogeneous resolution of the line images of the surfaces or surface portions, and in consequence, an image of the surfaces that does not have the above-mentioned distortion due to varying distance. When two or more sensors cooperate in taking an image, the first image may be the result of resampling the line images provided by the one or more sensors. For example, when a plurality of sensors are used to capture an image, a higher resolution may be achieved by such resampling than in the case that one single sensor takes consecutive line images.

In a preferred embodiment, the above-mentioned resampling eliminates or essentially eliminates differences in the surface resolution of the images of the surfaces or surface portions with different inclination to the reference plane. The term "surface resolution" is to be understood as the resolution with which the surface or surface portion is reproduced in the image. In simple terms, it defines how many pixels per unit length of the actual and real surface on the object are provided in the image of the surface. The surface resolution is measured along a line segment and is defined for a precise position on the surface and a certain direction. In general, the surface resolution in a given direction may be different at different positions and, vice versa, for a given position the surface resolution may be different for different directions. Usually the surface resolution is measured along the line image direction (X direction), more precisely along lines on the surface corresponding to line images, and/or along the direction perpendicular to the line images (Y direction). As will be explained in more detail below, a surface that is more strongly inclined to a plane perpendicular to the optical axis of a sensor will have less lines per unit length of the actual surface than a surface of the object that is perpendicular to said optical axis. Thus, depending on the inclination, a surface with the same dimensions may be represented by more or less pixels in the acquired image. By the above-mentioned resampling the differences in the surface resolution of surfaces with a different inclination are reduced and, in a preferred embodiment, eliminated or essentially eliminated so that the image of all surfaces or surface portions captured while the object is passing by the sensor (or vice versa) will have the same or essentially the same surface resolution in said direction.

The invention may provide that the resulting surface resolution of each surface or surface portion in said direction after resampling is lower or equal to a lowest surface resolution of the images of said surfaces or surface portions in the first image. This lowest surface resolution may be defined with regard to a certain direction and may especially be the lowest surface resolution in the above-mentioned direction oblique to said lines, but also the surface resolution in the direction of the lines or in the direction perpendicular thereto or, more generally, any direction. In respective embodiments of the invention, said lowest surface resolution may be the lowest surface resolution with regard to any direction relevant for image, character or text recognition or for decoding of an optical code. As the resulting surface resolution is lower than or equal to the lowest surface resolution of the first two-dimensional image, the resampling step implies that those regions having a higher surface resolution will be downsampled or subsampled to a lower resolution.

The invention may also provide:

for each line image in said first two-dimensional image, especially for each line image taken by a line sensor, determining an inclination of the surface or surface portion corresponding to the respective line images with regard to said reference plane, resampling the lines of the first two-dimensional image to render line images parallel to the line images of the first two-dimensional image, wherein after resampling the local two-dimensional picture resolution in the direction perpendicular to the lines corresponding to the line images is defined by a target resolution, multiplied by a factor that depends on the inclination of the respective surface or surface portion to said reference plane, wherein said factor is determined in such a way that independently from the inclination of said surfaces or surface portions, their surface resolution in said direction after resampling will be the target resolution or differ from the target resolution by an amount less than a certain predetermined threshold. The above-mentioned factor will typically have a value greater than zero and less or equal to one.

The two-dimensional picture resolution referred to above is the resolution of the two-dimensional first image formed by said line images, considered as the image of a planar object. Differently phrased, it is the resolution with reference to an imaged plane perpendicular to the optical axis of the sensor. When an object is moved past a line sensor with a constant speed and the line sensor takes line pictures with a constant sampling frequency, the two-dimensional picture resolution in the direction perpendicular to the lines will be constant. After resampling, the two-dimensional picture resolution at different locations will be different, but the surface resolution will be more homogeneous and preferably constant.

One may also describe this in terms of the surface resolution that after resampling the local surface resolution in the direction perpendicular to the lines is defined by the original surface resolution, divided by a number that depends on the inclination of the respective surface or surface portion to said reference plane, wherein said number is determined in such a way that independently from the inclination of said surfaces or surface portions, their surface resolution in said direction after resampling will be a given target resolution or differ from said target resolution by an amount less than a predetermined threshold. The above-mentioned number will typically have a value greater or equal to one.

The invention may provide that said target resolution is smaller or equal to the lowest surface resolution of the image of said surfaces or surface portions in said direction perpendicular to said lines in said first two-dimensional image.

Whereas in the above embodiment of the invention the inclination corresponding to the respective line image may, in principle, be determined for each line image as the local inclination at the place of a corresponding line on said surface, one will usually determine the inclination or an average inclination of the surface or surface portion for a group of lines and assign this inclination or average inclination to each line in this group in said step of determining an inclination for the line images. For example, if a plane surface having a fixed inclination is imaged, the (fixed) inclination of this surface, which may even be determined in advance of the imaging process, will be assigned to all line images corresponding to said surface.

Whereas according to a currently preferred embodiment the entire two-dimensional image will be resampled, the invention may also provide that said resampling will be limited to certain parts of this image or a different resampling will be carried out for different parts of the entire image. For example, if it is known or determined that certain surfaces that have been imaged do not suffer from distortion, the resampling may be limited to the region of those surfaces the image of which is distorted. Alternatively, one may resample the region of surfaces that suffer from a lesser distortion than surfaces in another region of the 2D image with a different target resolution. In principle, the invention may even provide to subject each surface (or even certain surface portions) to a resampling with an individual target resolution. This may, for example, be an option, if it is known that the symbols that are to be recognized are larger or smaller on one surface than on another surface.

In one embodiment, the target resolution is determined by the surface resolution of that surface or surface portion in said first image that has the strongest inclination to the reference plane or the lowest surface resolution of all surfaces or surface portions of said object that are imaged. However, the target resolution may also be less, which means that the image will be downsampled in the region of all surfaces or surface portions that are being processed. The resulting resolution has to be large enough for the purposes of the application. Especially, with applications in the field of image recognition, especially code recognition or character recognition, the resolution has still to be large enough to allow for proper recognition and decoding of codes or characters. Typical resolution values range from 130 to 220 dpi, depending on the application.

Suitable methods for such resampling are well-known and comprise, inter alia, line skipping, different kinds of interpolation, typically a linear or bilinear interpolation, coupled, when necessary, with suitable filters, such as the binomial filter or a FIR filter.

The invention may provide that said predetermined frequency is determined such that it yields a resolution higher or equal to said target resolution for that surface or surface portion which renders the lowest surface resolution when being imaged during said relative movement of said object with regard to said one or more line sensors.

Generally, the invention may provide that said predetermined frequency is equal to or higher than that necessary to yield the required resolution under the most unfavourable geometrical conditions. The frequency does not necessarily have to be constant, as long as this requirement is met. The invention may also provide using a frequency with predetermined variations. However, in a preferred embodiment of the invention a fixed frequency is used. The invention may especially provide that for an admissible range of inclinations with regard to said reference plane, that inclination is determined that yields the lowest surface resolution of a respective surface, and said predetermined frequency is set such that at least said target resolution is achieved for a surface with said inclination.

The invention may provide that in addition to and preferably before said resampling in said oblique direction, the line images are resampled so as to have the same surface resolution, which in said two-dimensional image corresponds to the surface resolution in the direction of the lines.

The invention may provide that forming said first two-dimensional image comprises:
sampling line images, especially consecutive line images, by said sensors, wherein said line images, taken together, define a two-dimensional image,
determining that line image that has the lowest surface resolution of a surface that was imaged,
downsampling the line images such that the differences in surface resolution between the line images are reduced and preferably eliminated and the surface resolution of the downsampling is equal to or less than said lowest surface resolution.

The invention may provide that the line images are downsampled such that differences in surface resolution between the line images are below a predetermined threshold.

One way of performing this step may be a method according to the prior art, for example according to WO 03/044586 A1.

The invention may also provide that the line sensor or said line sensors are set for each line image to be taken in such a way that differences in the surface resolution of the consecutive line images taken by a sensor are below a predetermined threshold and ideally the surface resolution of the line images is equal.

Said predetermined threshold will depend on the specific application. Especially for image recognition purposes and especially code or character recognition, the threshold is determined by the requirement that a reliable image code or character recognition must still be possible with the remaining distortions of the image of the surfaces or surface portions.

For example, the zoom of a line sensor or a line camera may be varied individually for each line image taken so as to achieve a homogeneous or approximately homogeneous surface resolution. Also in this regard, one may rely on techniques according to the prior art, such as that disclosed in EP 2 026 249 B1. Other software or hardware solutions to achieve an approximately homogeneous or homogeneous surface resolution of the line images will readily lend themselves to a person skilled in the art.

If a homogeneous surface resolution of line images in the first two-dimensional images is provided, in one embodiment of the invention the above-mentioned target resolution in said direction will be the same as the (homogeneous) surface resolution of the line images in the first two-dimensional image. Generally, the surface resolution in said oblique direction, especially in the direction of movement, can be adjusted to this surface resolution by setting said predetermined frequency accordingly. More specifically, by determining a range of admissible distances of a surface from a line sensor with a given zoom setting, it is possible to determine the worst surface resolution of a line image for the specific system. For example, with an object moving on a conveying device, the largest distance of a surface from a line sensor is less than that of the far edge of the conveying device in the direction of the optical axis of the line sensor. The camera system layout is usually designed so that this worst surface resolution will be equal or higher than the minimum resolution required by the application. Having determined this worst surface resolution, one can calculate the frequency necessary to achieve this surface resolution in said oblique direction, e.g. in the direction of movement, for the worst orientation of a surface, as described above. In some instances taking the worst surface resolution of a line image in said first image, i.e. the worst resolution in the direction of the lines, as the target resolution for said resampling in the direction perpendicular to the lines will lead to an imaging frequency that lowers the camera sensitivity more than is desired or acceptable. The invention may provide that the first image may be resampled in the direction of the lines to a target resolution that is lower than said worst surface resolution (with regard to the direction of the lines). The same target resolution will then also be used for the above-described resampling in said oblique direction, e.g. in the direction perpendicular to said lines. In a specific embodiment, the target resolution (for both directions) may be determined as the worst surface resolution in the direction oblique, especially perpendicular to said lines that results from imaging with the highest frequency that is provided for in the system or is otherwise acceptable or desirable.

Whereas according to the embodiment previously described, the image is resampled twice, namely in the direction of the lines and in a direction perpendicular to the lines, it is also possible to remove the distortion introduced by different acquisition distances and the surface inclination (cf. FIGS. 2 and 3) by resampling the acquired image along non parallel curves. Knowing the distance of the object for at least one line and the inclination of the surface to the reference plane, it is possible to define sampling curves, which, when the image is resampled according to these curves, will render a surface image with less or no difference in the surface resolution. Mathematically, if one considers two Cartesian reference systems X',Y' on the acquired image, one can construct a second image sampling this first image based on a non-linear coordinate transformation:

$$\begin{cases} x' = k_{00}x + k_{01}xy + k_{02} \\ y' = k_{11}y + k_{12} \end{cases}$$

For every pixel X,Y of the destination image one estimates the point x',y' of the source image, i.e. the image of the (inclined) surface captured by the camera. As x' and y' will normally not be integer numbers, i.e. the estimated point will not coincide with a single pixel in the original image, the value of the pixel in the destination image can be estimated in many ways. In most cases a bilinear interpolation is computed between the four points of the source images nearest to x',y'. This transformation is similar to an homography, although the perspective distortion of 1D cameras is different from perspective distortions of 2D cameras, for which homographies are used.

The invention may provide that said object passes a plurality of line cameras that are operated with the same predetermined frequency.

Especially, the invention may provide that the method is carried out with an imaging arrangement with a plurality of cameras as described in WO 2008/078129 A1, to which reference is made for further details.

The invention has a specific advantage in that it does not require a specific hardware or operation of hardware to produce images with reduced distortion or distortion-free images. Especially in the embodiment described above, all cameras can be operated with the same predetermined frequency to create distortion-free images without specific hardware or hardware settings for the line images taken by each of the cameras. Additionally different surface regions with different local surface resolution can be subsampled in different ways.

The invention may provide that in order to take said line images one or more lighting devices light the object with light pulses.

Especially, different lighting devices may be associated with different cameras, as described in WO 2008/078129 A1 and the light pulses may be synchronized so that light generated by at least one lighting device associated with a camera does not interfere with the acquisition of another of said cameras and the cameras acquire images only when the respective lighting device is active. In an embodiment with pulsed lighting, it is advantageous to be able to operate all cameras and thus all lighting devices with the same frequency, because this facilitates the timing of the light pulses for taking various line images.

The invention may provide that said predetermined frequency is determined and set individually for each object or for each group of objects that overlap each other in the imaging direction of at least one line sensor.

The invention also provides a system for capturing an image on a surface of an object by means of one or more line sensors, comprising means for carrying out the steps of one of the methods as described above, in particular a method of one of claims 1 to 11, especially means for taking consecutive line images from a plurality of surfaces or surface portions having a different inclination to a given reference plane with a predetermined frequency during a relative movement of said object with regard to one or more of said line sensors, means for forming a two-dimensional first image of the surfaces or surface portions from these line images, means for resampling said two-dimensional first image so as to reduce the surface resolution of images of surfaces or surface portions with regard to a direction oblique to the direction of lines corresponding to consecutive line images taken by a line sensor, especially at least in the direction perpendicular to these lines, in such a way that differences in the surface resolution of the images of the surfaces or surface portions with different inclination to said reference plane are reduced and preferably eliminated.

The invention also provides a system for capturing an image on a surface of an object comprising one or more line sensors for taking line images, especially consecutive line images, means for setting the frequency of images being taken by the sensor or sensors during a relative movement of said object relative to one or more of said line sensors, processing means for processing a first two-dimensional image of surfaces or surface portions of which consecutive line images have been taken, said processing means comprising means for resampling said two-dimensional first image so as to reduce the surface resolution of images of surfaces or surface portions with regard to a direction oblique to the direction of lines corresponding to consecutive line images taken by a line sensor, especially to the direction perpendicular to these lines, in such a way that differences in the surface resolution of the images of the surfaces or surface portions with different inclination to a given reference plane are reduced and preferably eliminated. A system according to the invention may comprise means for resampling said two-dimensional first image at least in a direction oblique to the direction of lines corresponding to consecutive line images taken by a line sensor, especially at least in the direction perpendicular to these lines, A system according to the invention may comprise a conveying device for carrying said object past said one or more line sensors.

In a specific embodiment, the line sensors may be stationary.

A system according to the invention may comprise means for determining the inclination of a surface or a surface portion with regard to the reference plane.

The invention may especially provide that a system according to the invention comprises means for measuring the distance of a surface or surface portion from a line sensor. In this embodiment, an inclination can be calculated from the change of the measured distance. Especially means may be provided to determine the distance with a frequency that is higher or equal to the imaging frequency, wherein the inclination is calculated from subsequent measurements. However, in code reading applications such a high frequency of distance sampling is not required and, in view of the computation expense, not necessarily desirable. In a preferred embodiment, the frequency of the distance measurement is less than the sampling frequency and hence an inclination will be determined from distance measurements at points that are more distant from each other than the lines. For example, distance measurements on a surface may be made every 10 mm to determine its inclination, whereas the line distance on the surface is in the range of 0.1 mm. This more coarse grained determination of the inclination also has the advantage of more stable data regarding the inclination. Alternatively, one may also average or interpolate a series of measurements to obtain stable data.

BRIEF DESCRIPTION OF THE DRAWINGS

Further features and advantages of the invention will become apparent from the subsequent description of specific embodiments of the invention with regard to the accompanying drawings.

DETAILED DESCRIPTION

Figure 1:
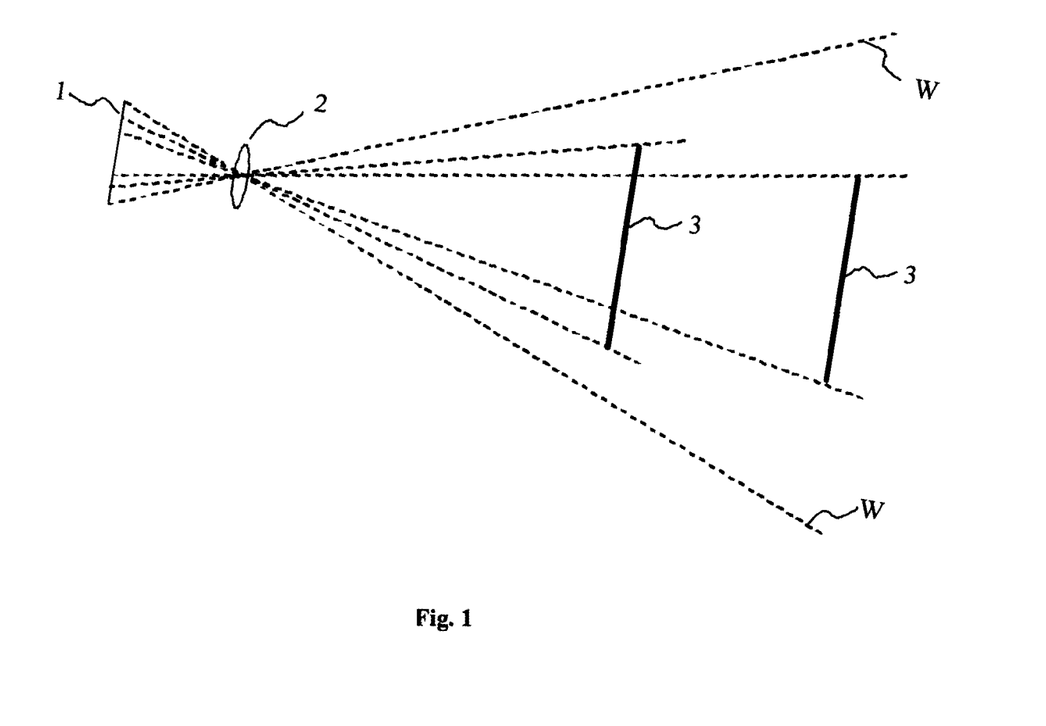
FIG. 1 illustrates the dependence of the surface resolution from the distance from a line sensor.

FIG. 1 schematically illustrates the dependence of the surface resolution of an image taken by a line sensor on the distance. As is illustrated, a line sensor 1 images objects 3 within the field of view of an angle W ideally originating from the center of lens 2. The portion of the line sensor 1 capturing an image of an object 3 will vary depending on the distance from the sensor. FIG. 1 shows the same object 3, centered about the optical axis A of the sensor, at different distances from sensor 1. One immediately recognizes from FIG. 1 that at the larger distance the object 3 is imaged on a smaller portion of the sensor 1 or a smaller number of sensor elements than at the shorter distance. Accordingly, a unit length on a surface that is more distant from the sensor will be imaged to a smaller portion or to less light sensitive elements and hence to less pixels than will be the case with the same unit length of a surface that is closer to the line sensor.

Figure 2:
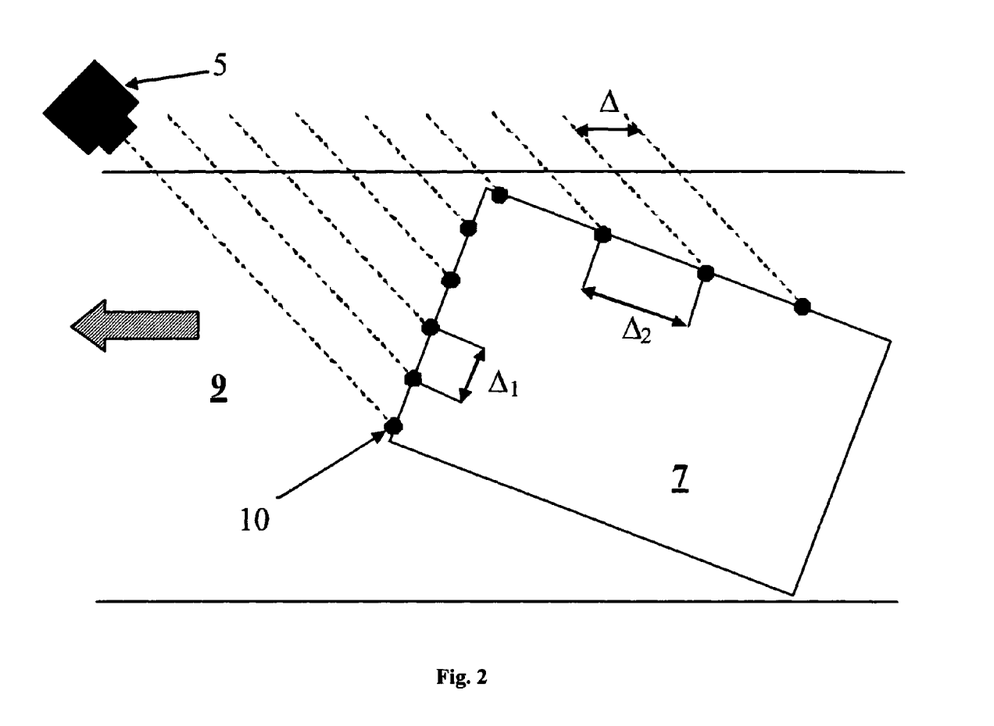
FIG. 2 illustrates the dependence of the surface resolution from the inclination of a surface.
Figure 3:
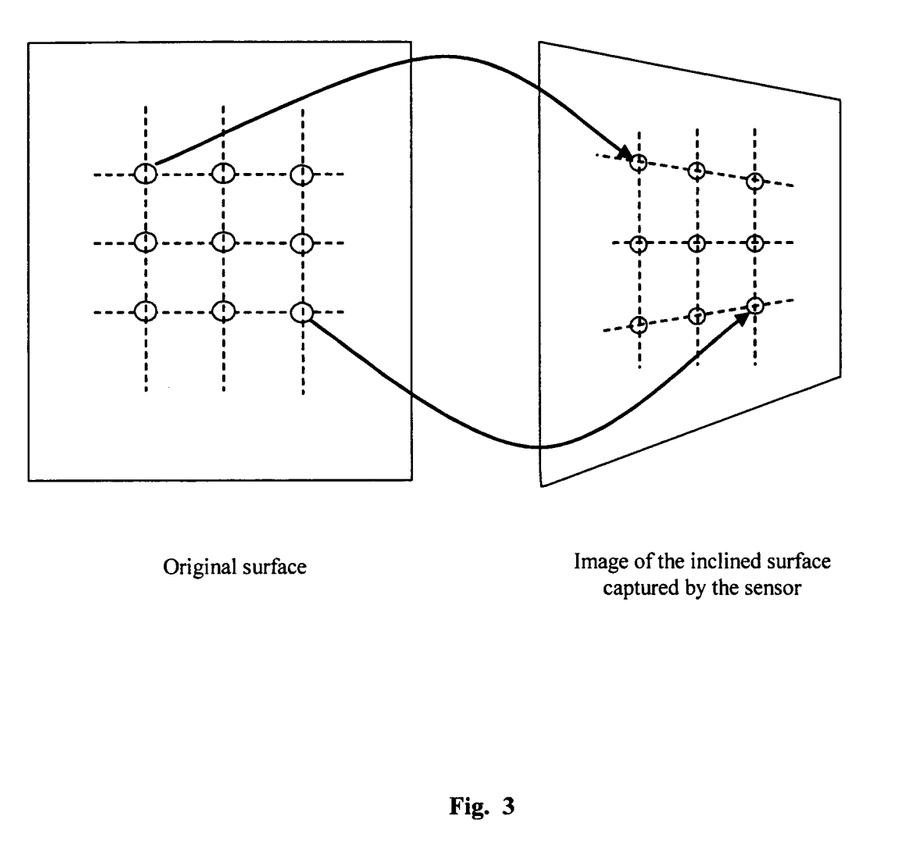
FIG. 3 illustrates the overall distortion of the image on an inclined surface.

FIG. 2 illustrates, in a top view, line images taken by a side camera 5 with a constant frequency from an object 7 with a rectangular footprint passing a line sensor at a constant speed on a conveyor 9. The broken lines indicate the camera view planes at consecutive times, the acquired lines being indicated by 10. The constant speed of the conveyor in combination with a constant imaging frequency translates into images being taken at constant spatial increments, indicated by $\Delta$, in the direction of movement of the conveyor. However, the constant increments in the direction of the conveyor translate into different increments on the surface, depending on its inclination. One can see from FIG. 2, that the surface that is less inclined to a plane perpendicular to the optical axis of the sensor will have more line images taken therefrom than the more inclined surface. In other words, the constant increment in the conveying direction translates into different spatial increments along the surface, indicated by $\Delta_1$ and $\Delta_2$.

FIG. 3 illustrates the effects of combination of the two distortions of FIG. 1 and FIG. 2 showing a surface and its two-dimensional image captured by a line camera with constant acquisition frequency when the distance of the view line changes in time.

The (constant) spatial increments $\Delta$ shown in FIG. 2 correspond to the two-dimensional picture resolution of the two-dimensional image that results from the consecutive line images taken by the camera. The increments $\Delta_1$ and $\Delta_2$ correspond to the surface resolution of the image of the two surfaces. One can see that $\Delta_1$ is smaller than $\Delta_2$ and hence the surface resolution of the image of the left surface is higher than that of the top surface. In the embodiment discussed above, in which one resamples to the worst surface resolution, the image will be resampled such that $\Delta_1 = \Delta_2$. To this end, the original surface resolution of the left surface is to be divided by a number greater than 1 (or $\Delta_1$ is to be multiplied by a number greater than 1). In terms of $\Delta$ the resampling means that the two-dimensional picture resolution will vary after resampling and the lines corresponding to the left surface will have a distance Δ that is larger than that of the lines corresponding to the top surface.

Figure 4:
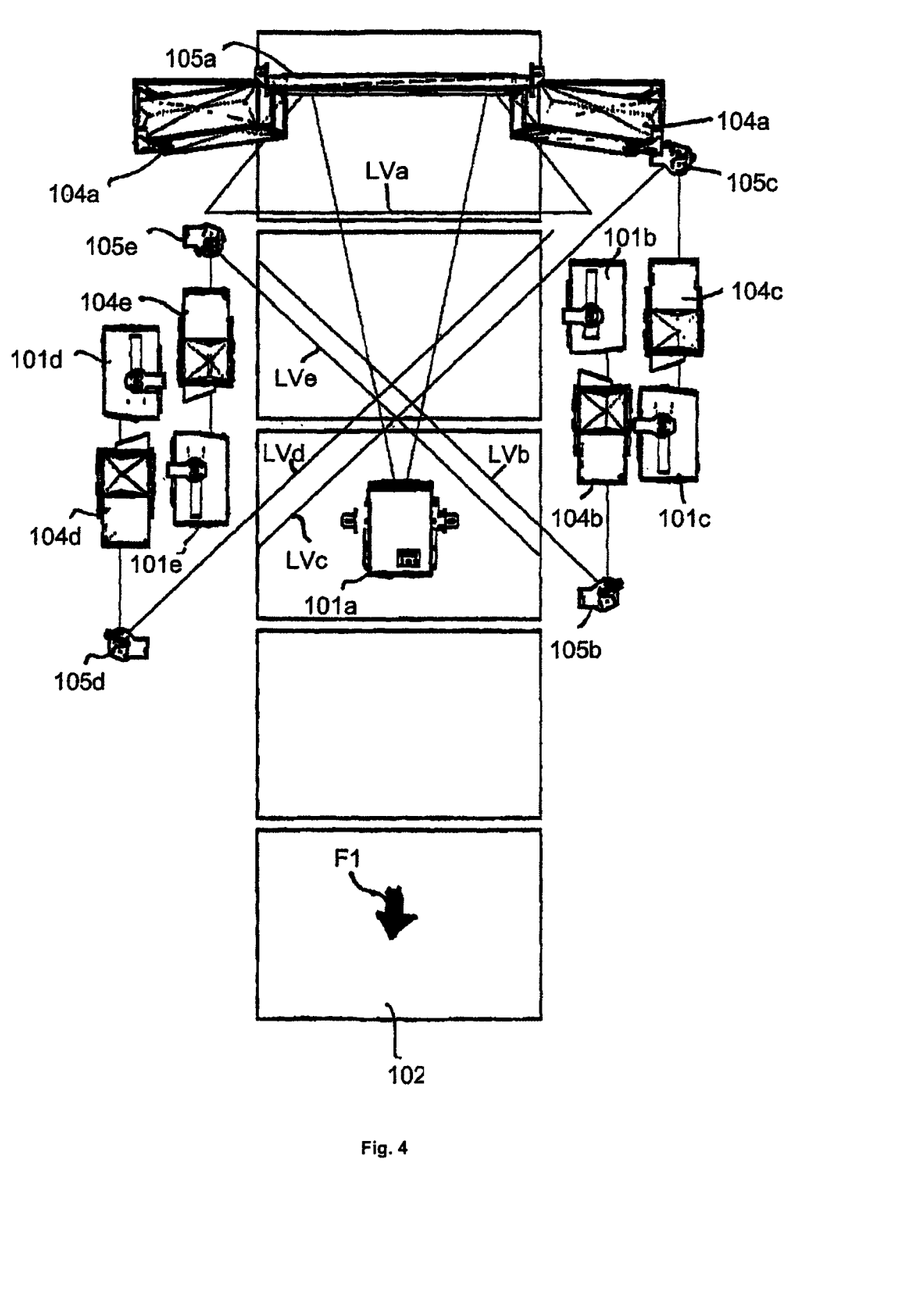
FIG. 4 shows a top plane view of a system for image acquisition according to the invention.

As was mentioned before, a system and method of the invention can be implemented with an arrangement as disclosed in WO 2008/078129 A1, which is illustrated in FIG. 4. FIG. 4 shows a system for image acquisition using five cameras to read optical codes printed or applied on the upper surface or one of the four side surfaces of an object travelling on a conveyor belt 102 in the direction indicated by the arrow F1.

The system shown in FIG. 4 especially comprises upper camera 101a, associated with a lighting device 104a, which provides pulsed light in synchronization with the image acquisition by camera 101a. Associated therewith is also a mirror 105a, through which the upper camera 101a reads optical information associated with the upper surface of passing object, along a view plane LVa. The system further comprises a left front camera 101b, associated with a respective lighting device 104b and a respective mirror 105b, through which the camera reads optical information associated with a front face or left-side face of passing object, along a view plane LVb. a left rear camera 101c, associated with a respective lighting device 104c and a respective mirror 105c, through which the camera reads optical information associated with the rear face and the left side face of a passing object, along a view plane LVc; a right front camera 101d, associated with a respective lighting device 104d and a respective mirror 105d, through which the camera reads optical information associated with the front face and the right side face of a passing object, along a view plane LVd; a right rear camera 101e, associated with a respective lighting device 104e and a respective mirror 105e, through which the camera reads optical information associated with the rear face and the right side face of a passing object, along a view plane LVe.

As one can see from the figure, the cameras and the mirrors are arranged so that the view planes of each camera cross the view planes of the neighbouring cameras. For example the view planes LVb and LVd, of the cameras 101b and 101d, respectively, and the view planes Lvb and LVc of the cameras 101b and 101c, respectively, cross each other.

As to further features and properties of the system according to FIG. 4, reference is made to WO 2008/078129. A system according to the invention may especially comprise all features and properties that are described in this document.

Figure 5:
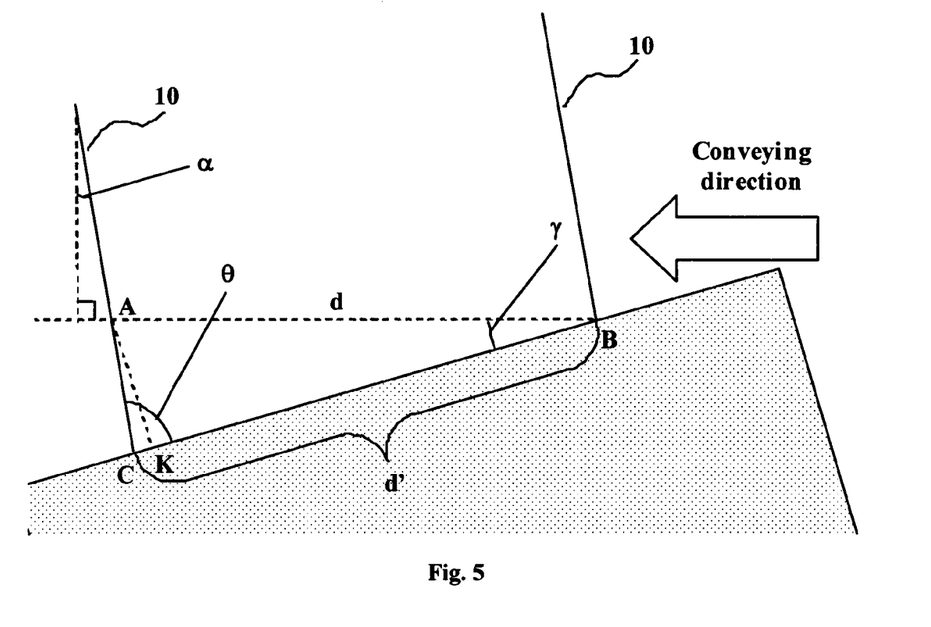
FIG. 5 illustrates the calculation of the resolution in the direction of movement.

FIG. 5 illustrates in more detail the geometrical relations between the travelling distance d between two consecutive images and the corresponding distance on the surface (d'), which determines the surface resolution.

Basically, the resolution in a plane parallel to the conveying direction and orthogonal to the conveying plane will translate into the respective surface resolution d' by a factor that is calculated as explained in more detail below.

FIG. 5 shows two consecutive imaging lines 10 relative to an object surface, wherein α is the sensor view angle, which is fixed and determines the inclination of the optical axis of the sensor to an axis perpendicular to the conveying direction, typical values of a are ±15° and ±45°

γ is the angle between an axis orthogonal to the conveying direction, which will be the vertical axis for top reading and a horizontal axis perpendicular to the conveying direction for side reading, and the axis orthogonal to the object surface.

δ=δ−α is the reading angle. Usually a surface is considered readable if |δ|<45°. Sometimes, in order to guarantee better performances a larger range is accepted.

d is the advance of the surface in the conveying direction between two scans, d' is the distance between two sensor scans on the surface.

Referring to FIG. 5, the purpose of this embodiment is to maintain a constant sampling resolution on the surface by acquiring with a given acquisition period P independent from parcel rotation and by subsampling the acquired lines by a subsampling factor $F_\alpha$.

$F_\alpha$ is a function of γ that depends from of the reading angle α.

By definition:

$$F_\alpha(\gamma) \geq 1 \qquad \text{Equation 1}$$

P and $F_\alpha$ can be computed based on the system geometry.

Referring to FIG. 5, say $d_T$ the distance of the lines in the subsampled image one wants to obtain:

$$d_T = F_\alpha(\gamma) * d' \qquad \text{Equation 2}$$

Moreover the distance d' between two samples on the object surface is proportional to d and the ratio depends from α and γ

$$d' = \frac{d}{f_\alpha(\gamma)} \qquad \text{Equation 3}$$

$f_\alpha(\gamma)$ is a geometric factor. With $$\theta = \frac{\pi}{2} - \gamma + \alpha$$

and furthermore $$BK = d * \cos(\gamma) \qquad \text{Equation 4}$$

$$AK = d * \sin(\gamma)$$

$$\frac{AK}{CK} = tg(\theta) = \frac{1}{tg(\gamma - \alpha)}$$

$$CK = AK * tg(\gamma - \alpha) = d * \sin(\gamma) * tg(\gamma - \alpha)$$

$$d' = CB = CK + BK$$

one obtains $$f_\alpha(\gamma) = \cos(\gamma) + \sin(\gamma) * tg(\alpha)$$

$f_\alpha(\gamma)$ is convex with a maximum in γ=α and symmetric around this point.

Figure 6:
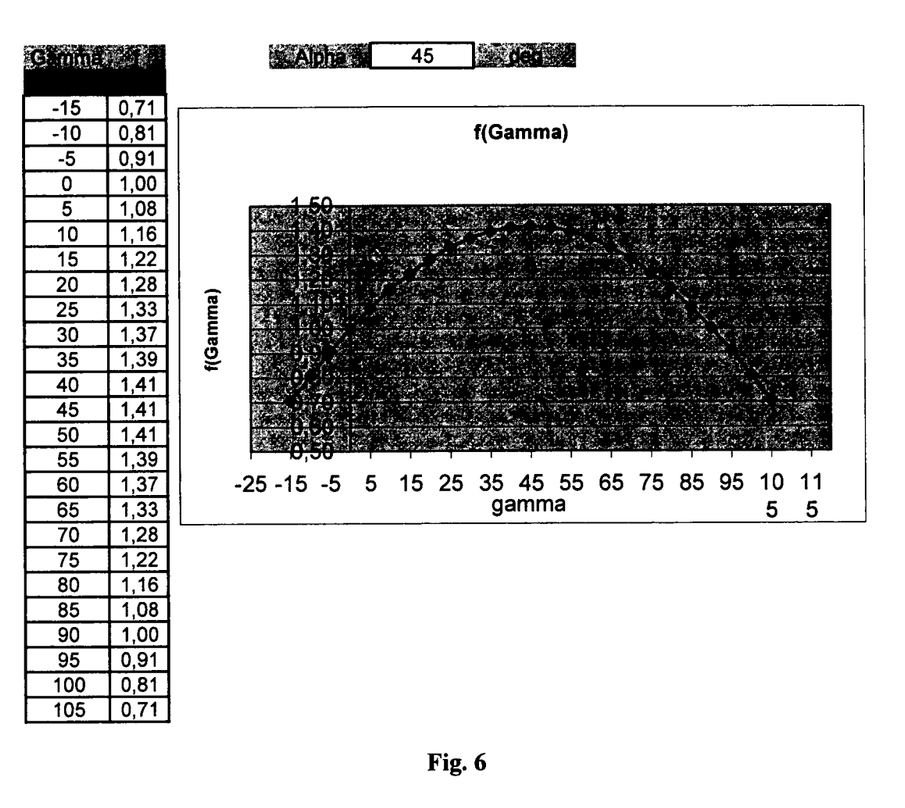
FIG. 6 shows the dependency of the resampling factor for a given sensor view angle in dependence of the inclination of the surface.

FIG. 6 shows a table and a graphical representation of $f_\alpha(\gamma)$ for α=45°.

Given a sampling period P and the current speed V, the distance between two samples in the conveying direction is $$d = V * P \qquad \text{Equation 5}$$

Than applying in order Equation 2, Equation 3 and Equation 5:

$$F_\alpha(\gamma) = \frac{d_T}{d'} = f_\alpha(\gamma)\frac{d_T}{d} = f_\alpha(\gamma)\frac{d_T}{V * P} \qquad \text{Equation 6}$$

Finally forcing the condition of Equation 1:

$$P \leq f_\alpha(\gamma)\frac{d_T}{V}$$

As P must be independent from γ, must be $$P \le f_{MIN} \frac{d_T}{V} \qquad \text{Equation 7}$$

Where $f_{MIN}$ is the minimum value of $f_\alpha(\gamma)$ in the required range of γ.

As usually a symmetric range of δ=γ−α is considered, the minimum of $f_\alpha(\gamma)$ coincides with $f_\alpha(\alpha+\delta_{MAX})$:

$$f_{MIN} = \cos(\alpha+\delta_{MAX}) + \sin(\alpha+\delta_{MAX})*tg(\alpha) \qquad \text{Equation 8}$$

Equation 7 can also be written:

$$P = K * f_{MIN}(\alpha) \frac{d_T}{V} \qquad \text{Equation 9}$$

Where K is a constant that can be arbitrarily selected in the range 0<K≤1. Guidelines for the selection are described below.

Substituting Equation 10 in Equation 6 allows to compute the subsampling factor:

$$F_\alpha(\gamma) = \frac{f_\alpha(\gamma)}{K * f_{MIN}} \qquad \text{Equation 10}$$

Referring to Equation 9, having a high sampling period P is preferable as this allows higher integration times and thus an higher signal to noise ratio in the acquired image or an higher depth of field. Than, when possible, K=1 is the preferred choice.

When using pulsed light and synchronized acquisition, as described in WO 2008/078129 A1, P must be the same for all the sensors of a reading station with overlapping lights and K is selected in order to obtain the maximum common sampling period. More precisely the sampling period P with K=1 is calculated for each camera and the minimum is chosen. Than, for each camera, the corresponding K is computed and used.

When working with encoder-driven acquisition, d=V*P is fixed and equal to the encoder step or to a multiple of it. In these cases a correct d must be chosen in order to satisfy Equation 7 for all the cameras:

$$d \le f_{MIN} d_T \qquad \text{Equation 11}$$

The features disclosed in the above specification, the claims and the drawings can be relevant for the realization of the invention in its various embodiments, both alone and in arbitrary combination thereof.

What is claimed is:

1. A method of capturing an image on a surface of an object by means of one or more line sensors, wherein consecutive line images are taken front a plurality of surfaces or surface portions having a different inclination to a given reference plane with a predetermined frequency during a relative movement of said object with regard to one or more of said line sensors and a two-dimensional first image of the surfaces or surface portions is formed from the line images, the method comprising resampling said two-dimensional first image so as to reduce the surface resolution of an image or of images of one or more surfaces or surface portions with regard to a direction oblique to the direction of the lines corresponding to consecutive line images taken by a line sensor in such a way that differences in the surface resolution of images of surfaces or surface portions with different inclination to said reference plane are reduced or eliminated.

2. The method according to claim 1, wherein the inclination of the surfaces or the surface portions with regard to the reference plane is determined and the thus determined inclination is used to calculate a correction to the resolution of the lines of the resampled image.

3. The method according to claim 1, comprising resampling said two-dimensional first image at least in a direction oblique to the direction of the lines corresponding to consecutive line images taken by a line sensor in such a way that differences in the surface resolution of images of surfaces or surface portions with different inclination to said reference plane are reduced or eliminated.

4. The method according to claim 1, Wherein the method comprises:
   for each line image in said first two-dimensional image determining an inclination of the surface or surface portion corresponding to the respective line images with regard to said reference plane, and
   resampling the lines of the first two-dimensional image to render line images parallel to the line images of the first two-dimensional image, wherein the surface resolution in the direction perpendicular to said lines after resampling is defined by the original surface resolution, divided by a number that depends on the inclination of the respective surface or surface portion to said reference plane, wherein said number is determined in such a way that independently from the inclination of said surfaces or surface portions, their surface resolution in said direction after resampling will be a given target resolution or differ from said target resolution by an amount less than a predetermined threshold.

5. The method according to claim 4, wherein said target resolution is smaller or equal to the lowest surface resolution of the image of said surfaces or surface portions in said direction in said first two-dimensional image.

6. The method according to claim 4 wherein said predetermined frequency is determined such that it yields a surface resolution higher or equal to said target resolution for that surface or surface portion which renders the lowest surface resolution when being imaged during said relative movement of said object with regard to said one or more line sensors.

7. The method according to claim 6, wherein forming said first two-dimensional image comprises:
   sampling line images by said sensors, wherein said line images, taken together, define a two-dimensional image,
   determining that line image that has lowest surface resolution of a surface that was imaged, and
   downsampling the line images such that the differences in surface resolution between the line images are reduced and the surface resolution after downsampling is equal to or less than said lowest surface resolution.

8. The method according to claim 1, wherein the line sensor or said line sensors arc set for each line image to be taken in such a way that differences in the surface resolution of the consecutive line images taken by a sensor are below a predetermined threshold.

9. The method according to claim 1, wherein said object passes a plurality of line cameras that are operated with the same predetermined frequency.

10. The method according to claim 9, wherein in order to take said line images one or more lighting devices light the object with light pulses.

11. The method according to claim 1, wherein said predetermined frequency is determined and set individually for each object or for each group of objects that overlap each other in the imaging direction of at least one line sensor.

12. A system far capturing an image on a surface of an object comprising one or more line sensors for taking line images, comprising:
   means for setting the frequency of images being taken by the sensor or sensors during a relative movement of said object with regard to one or more of said line sensors, and
   processing means far processing a first two-dimensional image of surfaces or surface portions of which consecutive line images have been taken, said processing means comprising means for resampling said two-dimensional first image so as to reduce the surface resolution of images of surfaces or surface portions with regard to a direction oblique to the direction of the lines corresponding to consecutive line images taken by a line sensor in such a way that differences in the surface resolution of the images of the surfaces or surface portions with different inclination to a given reference plane are reduced.

13. The system according to claim 12, comprising a conveying device for carrying said object past said one or more line sensors.

14. The system according to claim 12, comprising means for determining the inclination of a surface or a surface portion with regard to a reference plane.

* * * * *